United States Patent [19]
Quick

[11] 3,966,020
[45] June 29, 1976

[54] DIFFERENTIAL LUBRICATION SYSTEM

[75] Inventor: David C. Quick, New Berlin, Wis.

[73] Assignee: Allis-Chalmers Corporation, Milwaukee, Wis.

[22] Filed: Dec. 4, 1974

[21] Appl. No.: 529,350

[52] U.S. Cl. .............................. 184/11 R; 74/467; 184/11 A
[51] Int. Cl.² .......................................... F16N 7/26
[58] Field of Search .......... 184/13 R, 6, 6.12, 11 R, 184/11 B, 11 A; 74/467, 711

[56] References Cited
UNITED STATES PATENTS

| | | | |
|---|---|---|---|
| 2,654,441 | 10/1953 | Orr | 184/11 R |
| 2,668,601 | 2/1954 | Keese | 184/11 R |
| 3,182,527 | 5/1965 | Bryan | 74/467 |
| 3,429,400 | 2/1969 | Engle | 184/11 R |
| 3,533,488 | 10/1970 | Engle | 184/11 R |

Primary Examiner—Richard C. Pinkham
Assistant Examiner—Marvin Siskind
Attorney, Agent, or Firm—Arthur L. Nelson

[57] ABSTRACT

A differential having lubrication passages including flats on the shafts of the differential spider extending from externally of the differential casing through the differential pinion gears to convey lubrication to the pinion gear and shaft interface for lubrication of the differential. The pinion and ring gears define cone angles directed toward the lubrication groove of the differential.

10 Claims, 5 Drawing Figures

DIFFERENTIAL LUBRICATION SYSTEM

This invention relates to differentials for motor vehicles and more particularly to a lubricating means formed by grooves on the spider shafts for the differential pinion gears for conveying lubrication thrown on the external side of the differential housing by the engagement of the propeller shaft pinion gear with the differential ring gear. The lubrication passes through the grooves on the differential spider shafts to lubricate the interface between the differential pinion gears and the differential spider shafts.

Differentials on motor vehicles are usually included in the final drive assemblies to permit differential speed of the drive wheels. The differential distributes the torque from the propeller shaft to the two drive wheels to provide better driver control over the vehicle and reduce stress on the drive line parts and reduce tire wear particularly when the vehicle is turning.

The ring gear of the differential conventionally runs in lubrication which is retained on the facings of the teeth as it engages the pinion gear of the propeller shaft. Accordingly, lubrication of the ring gear and propeller shaft pinion gear creates no problem. The differential, however, includes a casing generally rotatably supporting a spider and pinion gears which engage side gears which in turn drive the drive axles driving the wheels. Lubrication of the differential pinion gears, however, can be a problem since lubrication does not always get into the casing of the differential to lubricate the spider shafts and pinion gears. Accordingly, this invention provides for such a lubricating system whereby the ring gear and propeller shaft pinion gear are lubricated and simultaneously the lubricant in the teeth of the ring gear is thrown upon the differential casing at a point which rotatably mounts the shafts of the spider which carry the pinion gears. Lubricating grooves are formed on the side of the shafts of the differential spider which convey lubricating fluid internally of the casing to the interface between the shafts of the differential spider and the differential pinion gears. Accordingly, the pinion gears are assured of constant lubrication while the differential is in operation.

It is an object of this invention to provide lubrication of a differential in a motor vehicle.

It is another object of this invention to provide a lubricating system for throwing lubricant against the differential casing and lubricating grooves on the differential spider to convey lubrication to the pinion gear and spider shaft interface.

It is a further object of this invention to provide a lubrication system for lubricating the differential pinion gears and shafts by providing lubricating passages on the differential spider shaft for transmitting lubrication from the external casing of a differential to the interface between the differential gears and the shafts of a differential spider.

The objects of this invention are accomplished by providing oil grooves on the shafts of the differential spider which support the pinion gears to supply lubrication to the interface between the shafts on the differential spider and the pinion gears. Lubricating fluid is supplied from a cavity in the differential housing as the differential assembly is rotated. As the ring gear rotates and engages the propeller shaft pinion gear, the lubrication carried between the gear teeth of the pinion gear are forced out of the ring gear teeth onto the casing of the differential which supports the end of the differential spider. The lubrication grooves on the shafts of the differential spider extend inwardly to the interface between the differential pinion gear and the shaft of the differential spider and convey a lubricant for lubricating of the differential pinion gears. Accordingly, the differential pinion gears are assured of lubrication so long as the differential is in operation.

Referring to the drawings, the preferred embodiment of this invention is illustrated.

Figure 1:
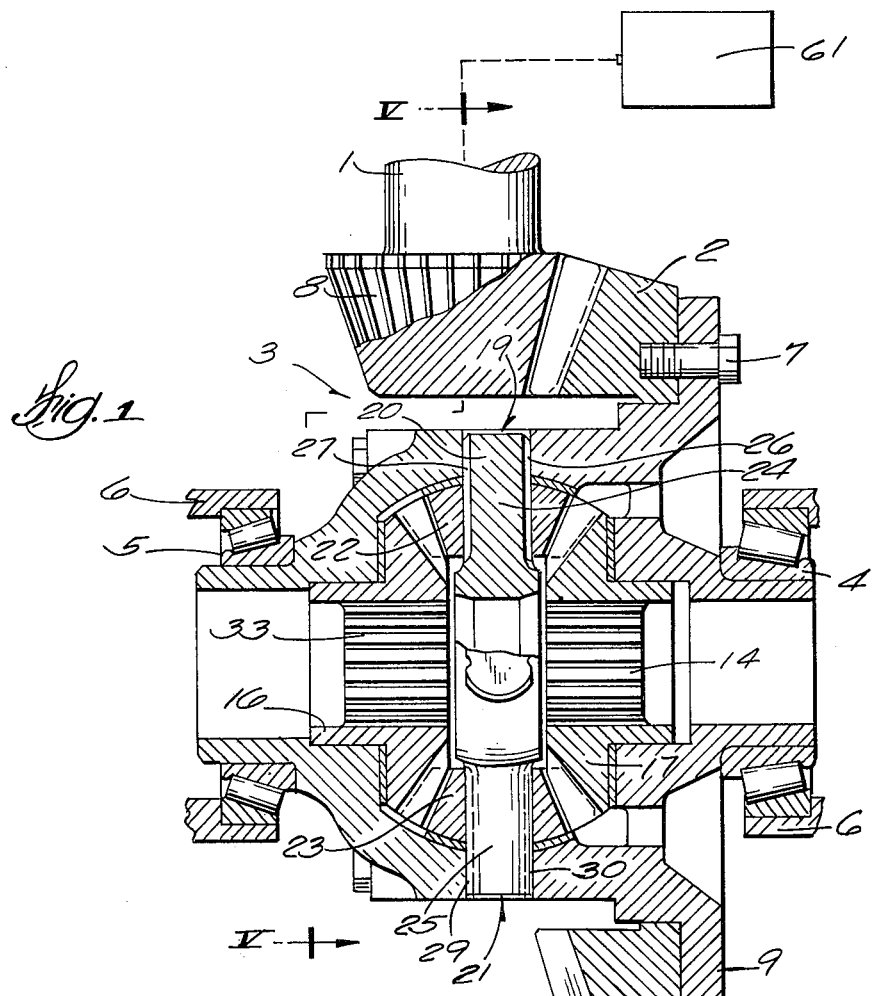
FIG. 1 is a cross section view illustrating the propeller shaft driving the differential of a motor vehicle.

Referring to the drawings, FIG. 1 is a top view of the differential in section. The propeller shaft 1 through pinion gear 8 drives the ring gear 2 on the differential 3. The pinion gear 8 and the ring gear 2 define cone angles directed toward the lubrication grooves 38. The differential 3 is rotatably mounted in bearing assemblies 4 and 5 in the differential housing 6. The differential 3 includes the ring gear 2 which is fastened by a plurality of bolts 7 to the differential casing 9. The spider 19 includes the spider shafts 20 and 21 which rotatably carry the pinion gears 22 and 23. The differential pinion gears 22 and 23 are carried on the bearing surfaces 24 and 25, respectively. The lubrication grooves 26 and 27 are formed on the sides of the shaft 20. The lubrication grooves 29 and 30 are formed on the sides of the shaft 21.

The differential pinions 22 and 23 engage the side gears 16 and 17. The side gear 16 is adapted for receiving a drive shaft in the spline 33 and extending through the opening 34 of the casing 9. The spline 14 of side gear 17 is adapted for receiving a drive axle extending through the opening 15 in the casing 9.

Figure 4:
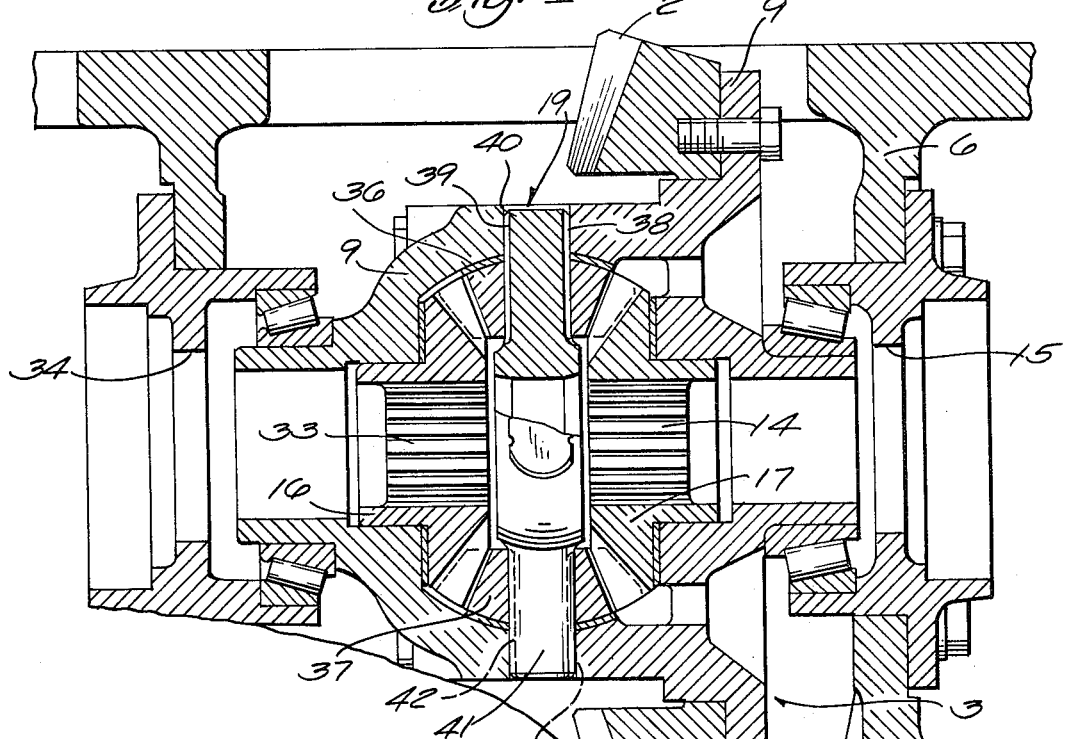
FIG. 4 is a cross section view illustrating the differential and the housing enclosing the differential and forming a lubrication cavity in which a portion of the differential runs.

FIG. 4 illustrates a differential in section and shows the differential pinions 36 and 37 engaging the side gears 16 and 17. The ring gear 2 is connected to the differential casing 9. The spider 19 is shown partially in section with the lubrication grooves 38 and 39 on the differential spider shaft 40. Similarly, the differential spider shaft 41 is shown with lubrication grooves 42 and 43.

The differential 3 rotates in lubrication in the cavity 44. The level 45 of lubricant in the differential cavity 44 of housing 6 is shown in which the differential rotates.

Figure 2:
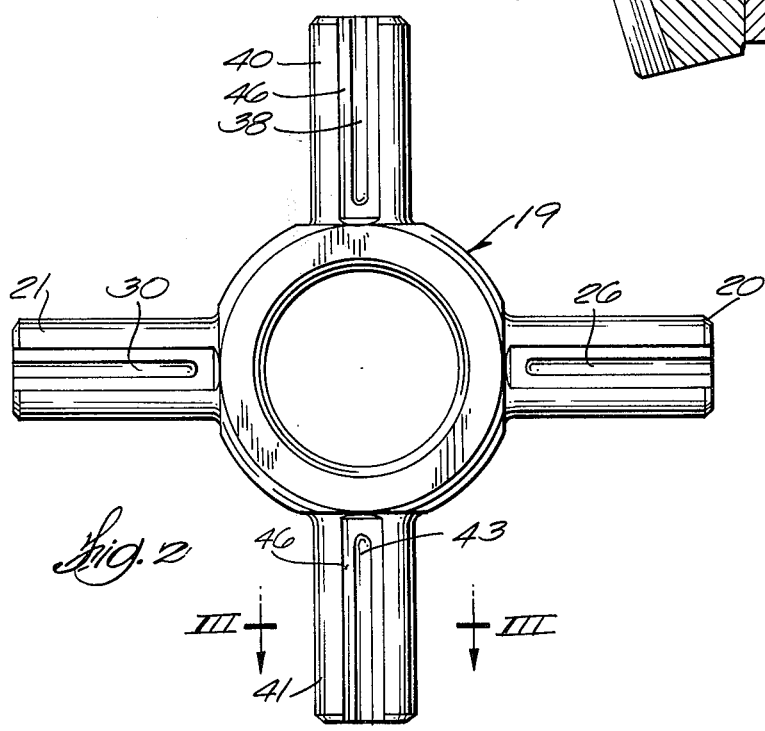
FIG. 2 is a view of the differential spider showing the lubrication flats and grooves.

FIG. 2 illustrates the differential spider 19 with the lubrication grooves 38 and 42 as well as the grooves 26 and 30. The lubricating groove 38 is formed by the flat surface 46 and recess 47 for conveying lubricating fluid from the external periphery of the differential casing 9 to the interface between the mating differential pinion and the shaft of the spider.

Figure 3:
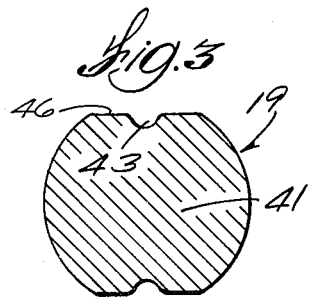
FIG. 3 is a cross section taken on line IV—IV of FIG. 2.

Referring to FIG. 3, the shaft 41 of the differential spider, the flat surface 46 and recess 43 are shown which form the lubricating groove 38 on the one side of the shaft 41. This provides a passage means between the external periphery of the differential casing 9 and the interface between the differential pinion gear 22 and the shaft 38.

The operation of the differential and lubricating means will be described in the following paragraphs.

Figure 5:
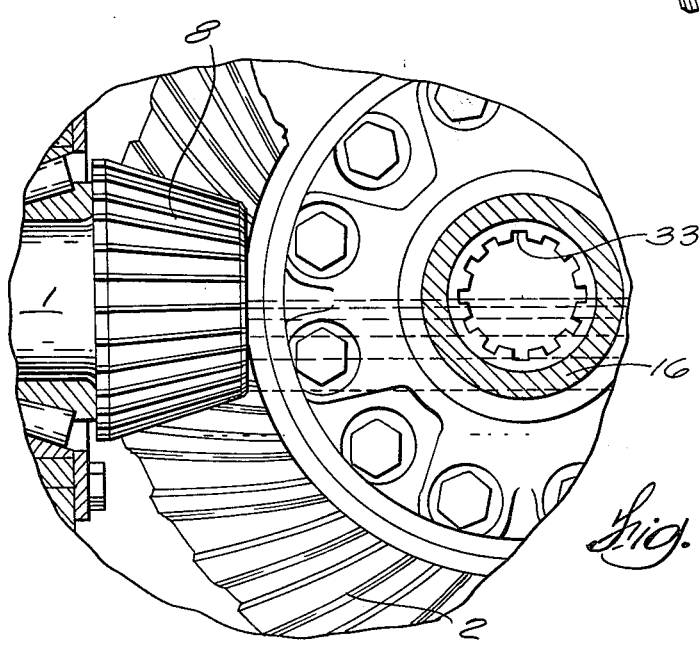
FIG. 5 is a fragmentary cross section view of the differential housing and the lubrication level taken on line V—V of FIG. 1.

The propeller shaft 1 and pinion 8 drives the differential 3 through the ring gear 2. The differential 3 is partially immersed in lubricant as indicated in FIG. 5. The ring gear is filled with lubricant and as it rotates upwardly and meshes with the propeller shaft pinion 8, the lubricant is forced out of the teeth of the ring gear onto the differential casing 9 at a point adjacent to the lubricating groove 26. The lubricant thrown on the periphery of the casing 9 tends to force the lubricant into the groove 26. The action of the rotating differential and the lubricant thrown on the outside of the casing 9 causes passage of the lubricant into the groove 26 and a film is formed on the bearing surface 24 on the shaft 20. The lubricant on the bearing surface 24 lubricates the interface between the pinion 22 and the shaft 20. This provides lubrication of the pinion 22 when the differential is in operation. Similarly, the other differential pinion gears are also lubricated through lubricating grooves formed on the differential spider 19. The propeller shaft 1 is driven by the engine 61 when the vehicle is in operation.

The embodiments of the invention in which an exclusive property or privilege is claimed are defined as follows:

1. A differential of a vehicle having lubricating means comprising, a differential casing defining differential spider bearing surfaces, a differential spider supported by said differential casing, at least two differential pinion gears rotatably mounted on said differential spider, a pair of side gears rotatably mounted in said casing and engaging said differential pinion gears, a differential housing rotatably supporting said differential casing and defining a cavity for lubrication, a ring gear connected to said differential casing for driving said differential about an axis common with the axis of rotation of said side gears, said differential spider defining lubricating passages on said spider shafts extending from the external periphery of said differential casing to the bearing interface between said differential gears and said shaft of said differential spider, a propeller shaft pinion gear driving said ring gear and defining a cone angle directed toward the lubricating passages on said spider shafts for throwing lubricant against the periphery of said differential casing and passages for lubricating the interface between the differential spider shaft and said differential pinion gears through said lubrication passages when said differential is in operation.

2. A differential of a vehicle having lubricating means as set forth in claim 1 wherein said differential spider includes four differential spider shafts each for supporting a differential pinion gear.

3. A differential of a vehicle having lubricating means as set forth in claim 1 wherein said lubricating passages define at least one flat surface on the shaft of said differential spider.

4. A differential of a vehicle having lubricating means as set forth in claim 1 wherein said lubricating passage is defined by a flat surface and a recess formed on the spider shaft of said differential spider for lubricating a mating pinion gear.

5. A differential of a vehicle having lubricating means as set forth in claim 1 wherein said differential spider defines a unitary structure.

6. A differential of a vehicle having lubricating means as set forth in claim 1 wherein said differential spider shaft defines at least two lubricating grooves formed on the periphery of each differential spider shaft.

7. A differential of a vehicle having lubricating means as set forth in claim 1 wherein said propeller shaft pinion gear and said ring gear define cone angles directed toward the passages on the shafts of said differential spider where said propeller shaft pinion gear meshes with said ring gear.

8. A differential of a vehicle having lubricating means as set forth in claim 1 wherein the cone angles of the engaging of said ring gear and said propeller shaft pinion gear converge at a point causing lubrication to be thrown in an area covering the external ends of the lubricating passages on said differential pinion shafts as said differential rotates.

9. A differential of a vehicle having lubricating means as set forth in claim 1 wherein said differential housing defines a cavity adapted for receiving lubricant for immersing a portion of said ring gear.

10. A differential of a vehicle having lubricating means as set forth in claim 1 wherein said differential spider shafts define said passages extending through said mating pinion gears for lubricating said side gears.

* * * * *